United States Patent
Chang et al.

(10) Patent No.: US 9,490,644 B2
(45) Date of Patent: Nov. 8, 2016

(54) RECONFIGURABLE COMPENSATOR WITH LARGE-SIGNAL STABILIZING NETWORK

(71) Applicant: Apple Inc., Cupertino, CA (US)

(72) Inventors: Arthur H. Chang, Irvine, CA (US);
Yongxuan Hu, Cupertino, CA (US);
Shimon Elkayam, San Jose, CA (US)

(73) Assignee: Apple Inc., Cupertino, CA (US)

(*) Notice: Subject to any disclaimer, the term of this patent is extended or adjusted under 35 U.S.C. 154(b) by 188 days.

(21) Appl. No.: 14/481,510

(22) Filed: Sep. 9, 2014

(65) Prior Publication Data
US 2015/0069957 A1    Mar. 12, 2015

Related U.S. Application Data (60) Provisional application No. 61/875,551, filed on Sep. 9, 2013.

(51) Int. Cl.
*H02J 7/00* (2006.01)

(52) U.S. Cl.
CPC .............. *H02J 7/0052* (2013.01); *H02J 7/007* (2013.01); *H02J 7/0065* (2013.01); *H02J 7/0004* (2013.01); *H02J 2007/0059* (2013.01)

(58) Field of Classification Search
CPC ...... H02J 7/0052; H02J 7/007; H02J 7/0065; H02J 7/022; H02J 7/0004; H02J 2007/0059
USPC .......................................................... 320/107
See application file for complete search history.

(56) References Cited

U.S. PATENT DOCUMENTS

| | | | | |
|---|---|---|---|---|
| 6,104,170 A * | 8/2000 | Lenk | ..................... | H02J 7/0052 320/163 |
| 7,202,634 B2 * | 4/2007 | Bucur | .................. | H02J 7/0018 320/137 |
| 9,178,382 B2 * | 11/2015 | Mao | ........................ | H02J 7/045 |
| 2006/0244420 A1 * | 11/2006 | Stanesti | ................ | H02J 7/0018 320/128 |
| 2006/0262579 A1 | 11/2006 | Chou | | |
| 2012/0139500 A1 | 6/2012 | Ye | | |
| 2012/0268063 A1 | 10/2012 | Qiu | | |
| 2012/0299553 A1 | 11/2012 | Menegoli et al. | | |
| 2012/0313572 A1 | 12/2012 | Sheu | | |
| 2013/0015827 A1 | 1/2013 | Shi | | |
| 2013/0088196 A1 | 4/2013 | Chen et al. | | |
| 2014/0103963 A1 * | 4/2014 | Chaware | .................. | H03K 3/00 327/108 |
| 2014/0203761 A1 | 7/2014 | Paparrizos | | |
| 2015/0042292 A1 | 2/2015 | Mao | | |
| 2015/0270731 A1 | 9/2015 | Adelmann | | |

FOREIGN PATENT DOCUMENTS

DE        102009038033 A1    2/2011

\* cited by examiner

*Primary Examiner* — Yalkew Fantu
*Assistant Examiner* — Manuel Hernandez
(74) *Attorney, Agent, or Firm* — Blank Rome LLP (57) ABSTRACT

During operation, the DC converter and a DC battery charger controller in a charger circuit transitions from a first error signal to a second error signal for use in charging a battery, wherein the first error signal and the second error signal, respectively, correspond to feedback sources in a plurality of feedback sources with a plurality of feedback sources. Then, the DC converter and a DC battery charger controller selects a gain and an impedance to ground of a damping circuit based on the selected second error signal, where the damping circuit applies the gain and the impedance to ground to the second error signal. Moreover, the DC converter and a DC battery charger controller selects one or more clamping voltages of a voltage-clamping circuit based on the selected second error signal, where the voltage-clamping circuit applies the one or more clamping voltages to an output from the damping circuit.

20 Claims, 9 Drawing Sheets

RECONFIGURABLE COMPENSATOR WITH LARGE-SIGNAL STABILIZING NETWORK

CROSS-REFERENCE TO RELATED APPLICATION

This application claims priority under 35 U.S.C. §119(e) to U.S. Provisional Application Ser. No. 61/875,551, entitled "Universal Power Adapter," by Yongxuan Hu, Arthur H. Chang, Shimon Elkayan, Collin Conners and Liyu Yang, filed on Sep. 9, 2013, the contents of which are herein incorporated by reference.

BACKGROUND

1. Field

The described embodiments relate to techniques for controlling operation a charger circuit associated with a battery. More specifically, the described embodiments relate to techniques for selecting a feedback source, gain and impedance to ground, and/or one or more clamping voltages in the charger circuit.

2. Related Art

During charging, a portable electronic device is typically connected to a power adapter, which transforms an AC power-line voltage into a DC input voltage that is used to charge the battery and/or power the portable electronic device. Moreover, many portable electronic devices include a charger circuit that further transforms the DC input voltage prior to charging the battery.

The configuration of the charger circuit and its function often depend on the DC input voltage of the power adapter and the charging voltage of the battery. However, there are a wide variety of power adapters (with different DC input voltages) and a wide variety of batteries (with different charging voltages). These variations often require more complexity in the charger circuit (with a commensurate increase in size and cost) or require the use of a particular power adapter with a given portable electronic device, which can be frustrating to users and can degrade the user experience.

SUMMARY

The described embodiments include a charger circuit. This charger circuit includes a feedback circuit that selects an error signal for use in charging a battery, where, at a given time, the error signal corresponds to a feedback source, and where the feedback source is one of a plurality of feedback sources with a plurality of feedback sources. Moreover, the charger circuit includes a damping circuit coupled to the feedback circuit, where the damping circuit has a gain and an impedance to ground to the error signal, and where the feedback circuit selects the gain and the impedance to ground of the damping circuit based on the selected error signal. Furthermore, the charger circuit includes a voltage-clamping circuit coupled to the damping circuit, where the voltage-clamping circuit has one or more clamping voltages, and where the feedback circuit selects the one or more clamping voltages based on the selected error signal.

Note that the selected gain, the impedance to ground, and the one or more clamping voltages reduce transients associated with a transition from a first feedback source in the plurality of feedback sources to a second feedback source in the plurality of feedback sources. For example, the selected gain and the impedance to ground of the damping circuit may modify a transient response of the damping circuit to be overdamped and/or critically damped.

Moreover, the plurality of feedback sources may include: a difference between an input current and an input-current reference, a difference between an output voltage and an output-voltage reference, a difference between a battery-charge current and a battery-charge-current reference, a temperature, an input power, and an input voltage. Furthermore, the one or more clamping voltages may include: an upper clamping voltage and/or a lower clamping voltage.

In some embodiments, the charger circuit includes a comparator and a driver circuit coupled to the voltage-clamping circuit and configured to couple to a DC/DC converter. For example, the comparator may include a pulse-width-modulation comparator. Additionally, the charger circuit may include a buffer circuit coupled to the comparator and the driver circuit.

Another embodiment provides an electronic circuit that includes: an integrated circuit; the battery described above, coupled to the integrated circuit, having the charging voltage; and the charger circuit described above coupled to the battery.

Another embodiment provides a method for reducing transients associated with a transition from a first error signal to a second error signal. During the method, a transition is made from the first error signal to the second error signal for use in charging the battery, where the first error signal and the second error signal, respectively, correspond to feedback sources in the plurality of feedback sources. Then, the gain and the impedance to ground of the damping circuit are selected based on the selected second error signal, where the damping circuit applies the gain and the impedance to ground to the second error signal. Next, the one or more clamping voltages of the voltage-clamping circuit are selected based on the selected second error signal, where the voltage-clamping circuit applies the one or more clamping voltages to an output from the damping circuit.

DETAILED DESCRIPTION

Figure 1:
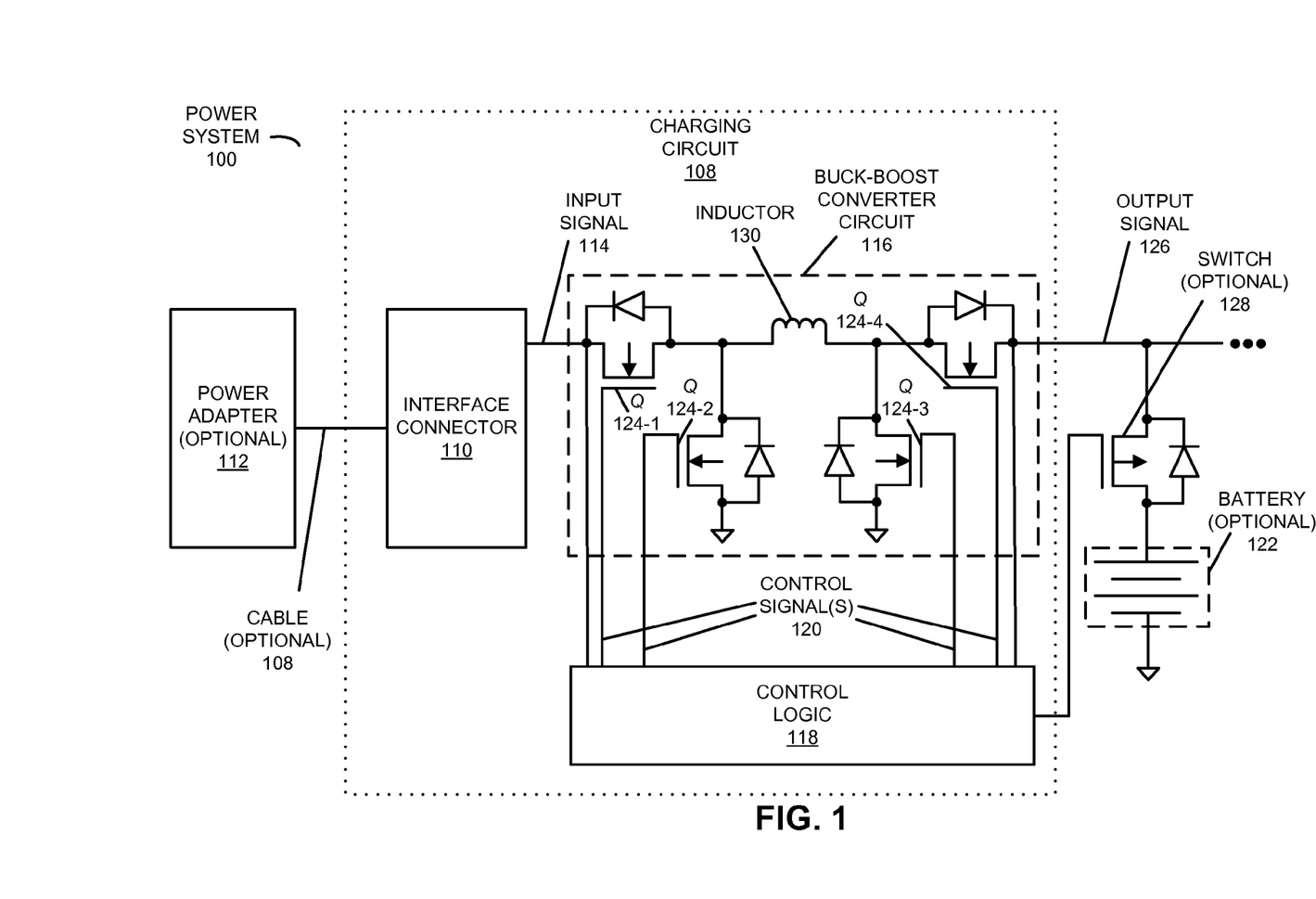
FIG. 1 is a block diagram illustrating a charger circuit in accordance with an embodiment of the present disclosure.

FIG. 1 presents a block diagram illustrating a power system 100 that includes: optional power adapter 112, a charger circuit 108, switch 124, optional switch 128 and optional battery 122. Moreover, charger circuit 108 may include: an interface connector 110, a buck-boost converter circuit 116 and control logic 118. Furthermore, buck-boost converter circuit 116 may include: switches 124 and inductor 130. The switches may comprise a first switch 124-1 that may selectively couple a first side of inductor 130 to interface connector 110, a second switch 124-2 that may selectively couple the first side of inductor 130 to ground, a third switch 124-3 that may selectively couple a second side of inductor 130 to ground, and a fourth switch 124-4 that may selectively provide output signal 126 to optional battery 122 and/or a system load. For example, fourth switch 124-4 may selectively couple the second side of inductor 130 to optional battery 122 (although it should be appreciated that optional switch 128 or another element may selectively control the connection between the second side of inductor 130 to optional battery 122). Note that optional power adapter 112 may be configured to receive AC power by coupling to an AC power line provided by an electrical power grid and may convert AC electrical signals to DC electrical signals. Moreover, optional power adapter 112 may use include a full-bridge rectifier, a half-bridge rectifier and/or a fly-back converter circuit to perform the conversion. In addition, note that optional battery 122 may include one or more cells or one or more battery packs, and that optional battery 122 may have a charging voltage (e.g., a voltage set by power system 100 at which optional battery 122 will be charged). However, optional battery 122 is not limited to a particular construction.

During operation of power system 100, optional power adapter 112 provides an input signal 114 having an input voltage to interface connector 110 via a cable having one or more signal lines. Then, interface connector 110 provides input signal 114 to buck-boost converter circuit 116 and control logic 118. Based on the input voltage and the charging voltage, control logic 118 may select an operating mode (or the mode) of buck-boost converter circuit 116 from a group of modes, which may include (but is not limited to): a buck mode and a boost mode. In particular, control logic 118 may generate one or more control signals 120 based on: the input voltage, the charging voltage, information received via interface connector 110 and/or the battery voltage. These control signals may specify switching states (such as open or closed) of switches (Q) 124 (such as field-effect transistors or FETs) to select the operating mode. Moreover, buck-boost converter circuit 116 may output or provide output signal 126 (such as a charging signal) to optional battery 122 to charge optional battery 122 and/or a device load to power an electronic device that includes power system 100. As shown in FIG. 1, control logic 118 may control the switching state of switch 128 (such as a field-effect transistor or a FET) to gate when optional battery 122 is charged (such as when optional power adapter 112 and/or buck-boost converter circuit 116 are appropriately configured for operation).

Thus, at a given time, buck-boost converter circuit 116 operates in a mode selected from the group of modes. For example, selection of mode (and the resulting one or more control signals 120 which may implement the mode) may be based on whether the input voltage is higher or lower than the charging voltage (and/or the battery voltage). In particular, buck-boost converter circuit 116 may include (or, using switches 124, may be configured to operate as) a boost circuit when in the boost mode and, if the charging voltage exceeds the input voltage by a predetermined amount (such as when the input voltage less than a first voltage threshold), buck-boost converter circuit 116 may operate in the boost mode and the boost circuit may be selectively coupled to optional battery 122. To operate buck-boost converter circuit 116 in the boost mode, the one or more control signals 120 may close first switch 124-1 and may open second switch 124-2 (i.e., first switch 124-1 is on and second switch 124-2 is off). Then, charging circuit 108 may perform DC/DC power conversion on input signal 114 to generate output signal 126. During this power conversion, third and fourth switches 124-3 and 124-4 may alternately switch (so that third switch 124-3 is on when fourth switch 124-4 is off, and vice versa) based on the one or more control signals 120. For example, third and fourth switches 124-3 and 124-4 may be switched at a switching frequency. In some examples, the switching frequency may be between 100 KHz and 2 MHz, although it should be appreciated that the switching frequency may be set to any value as appropriate. (For example, the switching may be at a frequency between 10 kHz and 10 MHz depending on the size of inductor 130 in charging circuit 108 and/or acceptable switching losses.) This switched-mode power conversion may allow more power at the appropriate charging voltage (and based on the capabilities of optional power adapter 112) to be provided to optional battery 122 when optional power adapter 112 provides input signal 114 having a lower input voltage than the charging voltage.

Moreover, buck-boost converter circuit 116 may include (or, using switches 124, may be configured to operate as) a buck circuit when in the buck mode and, if the charging voltage is less than the input voltage by a predetermined amount (such as when the input voltage greater than a second voltage threshold, which may occur when optional power adapter 112 is a so-called 'high-voltage' power adapter), buck-boost converter circuit 116 may operate in the buck mode and the buck circuit may be selectively coupled to optional battery 122. To operate buck-boost converter circuit 116 in a buck mode, the one or more control signals 120 may open third switch 124-3 and may close fourth switch 124-4 (i.e., third switch 124-3 is off and fourth switch 124-4 is on). Then, charging circuit 108 may perform DC/DC power conversion on input signal 114 to generate output signal 126. During this power conversion, first and second switches 124-1 and 124-2 may alternately switch based on the one or more control signals 120 (so that first switch 124-1 is on when second switch 124-2 is off, and vice versa). For example, first and second switches 124-1 and 124-2 may be switched at a switching frequency. In some examples, the switching frequency may be between 100 KHz and 2 MHz, although it should be appreciated that the switching frequency may be set to any value as appropriate. This switched-mode power conversion may also allow more power at the appropriate charging voltage (and based on the capabilities of optional power adapter 112) to be provided to optional battery 122 when optional power adapter 112 is current limited (which, in turn, may facilitate or enable optional power adapter 112 to be more compact).

While a wide variety of battery types and configurations may be used in conjunction with the charging circuit described above, lithium-ion batteries are used as an illustrative example in the following discussion. Lithium-ion batteries are widely used in portable electronic devices because of their high energy density, long cycle life and the absence of memory effects. For example, the lithium-ion battery pack (i.e., the battery) used in laptop computers often includes two or three battery cells in series. Typically, a power adapter converts the 110 or 220 V AC power-line voltage to the input source voltage (or input voltage) for the battery charger. For laptop computers, the input voltage to the charging circuit from the power adapter is usually in the range of 10-20 V (such as 12 or 15 V). Alternatively, because of the popularity of the universal-serial-bus interface, the input voltage may be 5 V. Note that the aforementioned numerical values are for purposes of illustration only, and other values may be used for different power adapters, batteries and/or system requirements.

For some batteries (e.g., such as some two-cell configurations, the battery-pack voltage may be between 6 and 8.7 V (i.e., the battery pack may experience a range of voltages during operation). In some instances, charging circuit 108 may be configured to connect to power adapters that provide input voltages that are either less than the lowest battery pack voltage (e.g., 5 V when the battery voltage is between 6 and 8.7 V) or greater than the highest battery pack voltage (e.g., 12 or 15 V when the battery voltage is between 6 and 8.7 V). (Thus, the predetermined amount may be at least 0.5 V.) As described previously, buck-boost converter circuit 116 may operate in a buck mode and a boost mode. Therefore, buck-boost converter circuit 116 can take or operate using the input voltages in the preceding examples. In particular, in these examples buck-boost converter circuit 116 may operate in either the buck mode or the boost mode because the 6 to 8.7 V battery-pack voltage is always lower than the input voltage (which results in operation of buck-boost converter circuit 116 in the buck mode), or always higher than the input voltage (which results in operation of buck-boost converter circuit 116 in the boost mode).

Similarly, for some three-cell configurations, the battery-pack voltage may be between 9 and 13.05 V (i.e., the battery pack may experience a range of voltages during operation). Once again, in some instances charging circuit 108 may be configured to connect to power adapters that provide input voltages that are either less than the lowest battery pack voltage (e.g., 5 V when the battery voltage is between 9 and 13.05 V) or greater than the highest battery pack voltage (e.g., 12 or 15 V when the battery voltage is between 9 and 13.05 V). As described previously, buck-boost converter circuit 116 may operate in a buck mode and a boost mode. In particular, in these examples buck-boost converter circuit 116 may operate in either the buck mode or the boost mode because the 9 to 13.05 V battery-pack voltage is always lower than the input voltage (which results in operation of buck-boost converter circuit 116 in the buck mode), or always higher than the input voltage (which results in operation of buck-boost converter circuit 116 in the boost mode).

Thus, buck-boost converter circuit 116 may operate over a range of input voltages (such as 5-20 V) and charging voltages (such as 6-20 V, e.g., 8 V). However, it should be understood that these numerical values are for purposes of illustration only, and that other battery configurations, input voltages and/or charging voltages may be used.

In some embodiments, when interface connector 110 is de-coupled from optional power adapter 112, buck-boost converter circuit 116 may be placed in the boost-mode configuration. This may ensure that charging circuit 108 reverts to an operating mode that initially expects input signal 114 to have a low input voltage (approximately 5V) if and when charging circuit 108 is re-coupled to optional power adapter 112. However, in some embodiments, while charging circuit 108 defaults to the boost mode, it does not operate until optional power adapter 112 is connected or coupled to interface connector 110. Alternatively, even after optional power adapter 112 is connected or coupled to interface connector 110, charging circuit 108 may not operate until communication of information with optional power adapter 112 occurs. In particular, as described further below with reference to FIG. 2, in embodiments where optional power adapter 112 can be configured, the information received from optional power adapter 112 may include the input voltage and when optional power adapter 112 is ready to charge optional battery 122 from optional power adapter 112, and the information provided to optional power adapter 112 may include the charging voltage and/or the operating mode. This information may allow optional power adapter 112 and/or charging circuit 108 to be configured and may synchronize their operation. However, operation of optional power adapter 112 and/or charging circuit 108 may or may not involve communication of the information between optional power adapter 112 and charging circuit 108.

In addition, as noted previously, for a given battery and a given power adapter, buck-boost converter circuit 116 may operate in a mode selected from the group of modes that includes (but is not limited to): the boost mode and the buck mode (e.g., in some ranges of the input voltage and/or the charging voltage there may be other types of modes or operating modes). Thus, the configuration of buck-boost converter circuit 116 described above may occur when optional power adapter 112 is coupled or de-coupled from interface connector 110, when the input voltage changes and/or in the event that a thermal limit is reached (e.g., if charging circuit 108 shuts down, buck-boost converter circuit 116 may be placed in the boost-mode configuration).

By facilitating configuration of buck-boost converter circuit 116, the charging technique may allow more flexible use of different power adapters and may allow more compact and lower cost power adapters. Consequently, the charging technique may reduce user frustration and may improve the overall user experience when using electronic devices that includes power sources, such as batteries, which need to be routinely recharged.

We now describe an embodiment of the communication between charger circuit 108 and optional power adapter 112 that is used by control logic 118 to determine and select the operating mode (which may include, but is not limited to, the boost mode or the buck mode) of buck-boost converter circuit 116. Moreover, the information exchanged between charger circuit 108 and optional power adapter 112 may be used to configure the optional power adapter 112 and/or when the optional power adapter 112 is ready for operation. For example, the exchanged information may include: the input voltage from optional power adapter 112, the charging voltage to optional power adapter 112, and when optional power adapter 212 is ready to charge optional battery 122. Note that configuring the operation of charger circuit 108 and optional power adapter 112 may be useful because the input voltage can vary over a range, while optional battery 122 may require a particular charging voltage.

Figure 2:
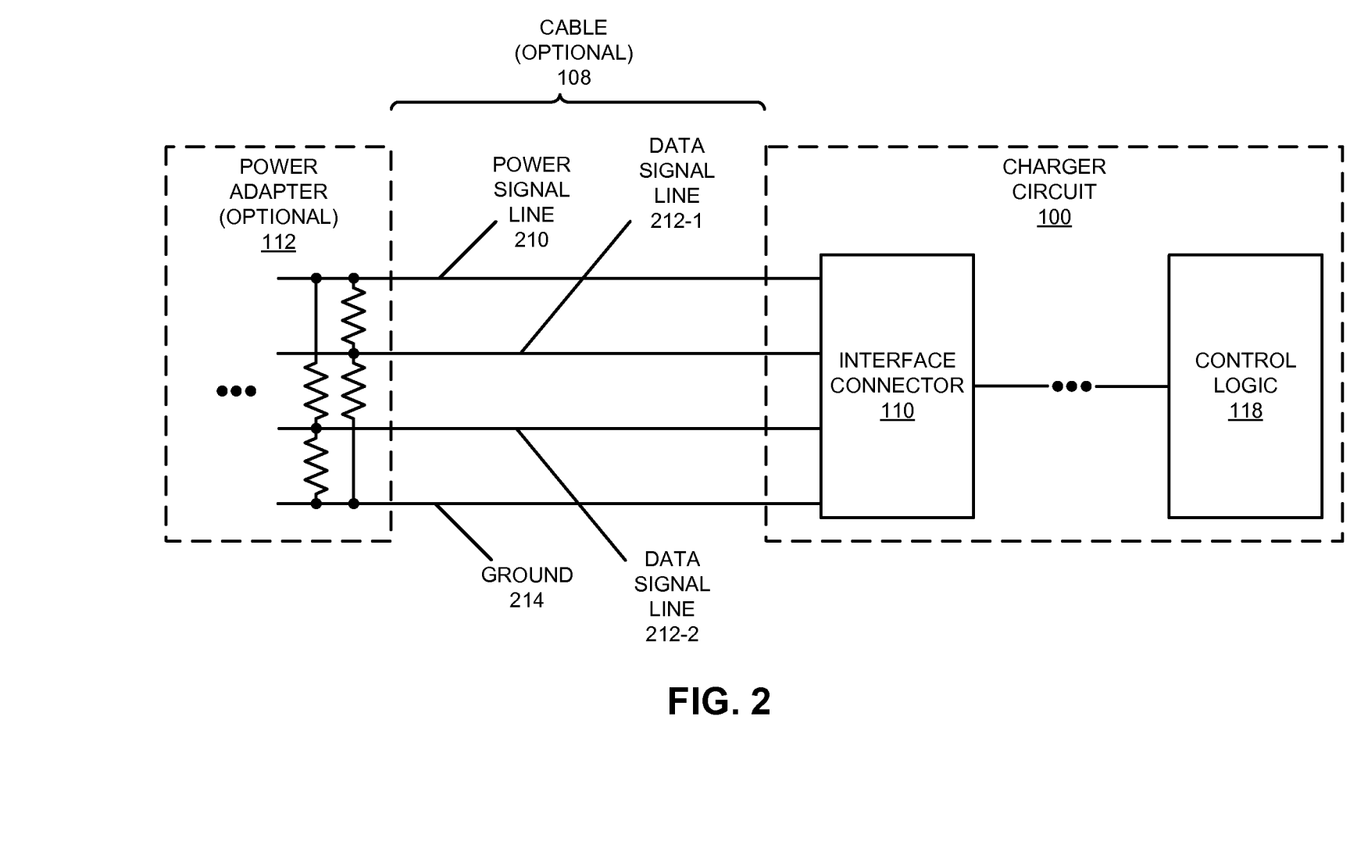
FIG. 2 is a block diagram illustrating an interface connector in the charger circuit of FIG. 1 in accordance with an embodiment of the present disclosure.
Figure 3:
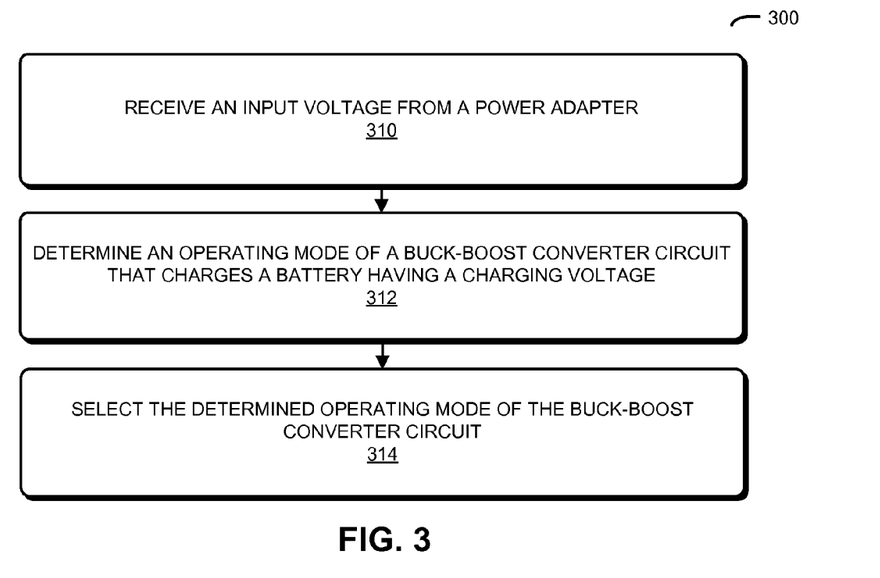
FIG. 3 is a flowchart illustrating a method for charging a battery in accordance with an embodiment of the present disclosure.

FIG. 2 presents a block diagram illustrating signal lines connected or coupled to interface connector 110 in charger circuit 108 (FIG. 1). This interface connector includes: a power signal line 210, one or more data signal lines 212, and ground 214. In this embodiment, control logic 118: determines the input voltage from optional power adapter 112 relative to ground 214 on power signal line 210 and/or the one or more data signal lines 212; optionally communicates the charging voltage to optional power adapter 112 via the one or more data signal lines 212; optionally receives a reply from optional power adapter 112 indicating that optional power adapter 212 is ready to charge optional battery 122; and provides the one or more control signals 120 to buck-boost converter circuit 116 to select a mode in the group of modes, which may include the buck mode and the boost mode. (Thus, the communication may or may not involve feedback from optional power adapter 112. Moreover, the communication may or may not include the exchange of information that indirectly specifies the charging voltage, such as the operating mode of charger circuit 108, and/or that is other than the charging voltage, such as the voltage on optional battery 122. This is because not all power adapters are capable of being configured.) For example, the one or more data signal lines 212 may be resistively terminated, which may allow control logic 118 to determine the charging capability of optional power adapter 112 (i.e., if it is capable of providing the charging voltage) based on a determined voltage or resistance.

We now describe an embodiment of the communication between charger circuit 108 and optional power adapter 112 that is used by control logic 118 to determine and select the operating mode (which may include, but is not limited to, the boost mode or the buck mode) of buck-boost converter circuit 116. Moreover, the information exchanged between charger circuit 108 and optional power adapter 112 may be used to configure the optional power adapter 112 and/or when the optional power adapter 112 is ready for operation. For example, the exchanged information may include: the input voltage from optional power adapter 112, the charging voltage to optional power adapter 112, and when optional power adapter 112 is ready to charge optional battery 122. Note that configuring the operation of charger circuit 108 and optional power adapter 112 may be useful because the input voltage can vary over a range, FIG. 2 presents a block diagram illustrating signal lines connected or coupled to interface connector 110 in charger circuit 108 (FIG. 1). This interface connector includes: a power signal line 210, one or more data signal lines 212, and ground 214. In this embodiment, control logic 118: determines the input voltage from optional power adapter 112 relative to ground 214 on power signal line 210 and/or the one or more data signal lines 212; optionally communicates the charging voltage to optional power adapter 112 via the one or more data signal lines 212; optionally receives a reply from optional power adapter 112 indicating that optional power adapter 112 is ready to charge optional battery 122; and provides the one or more control signals 120 to buck-boost converter circuit 116 to select a mode in the group of modes, which may include the buck mode and the boost mode. (Thus, the communication may or may not involve feedback from optional power adapter 112. Moreover, the communication may or may not include the exchange of information that indirectly specifies the charging voltage, such as the operating mode of charger circuit 108, and/or that is other than the charging voltage, such as the voltage on optional battery 122. This is because not all power adapters are capable of being configured.) For example, the one or more data signal lines 212 may be resistively terminated, which may allow control logic 118 to determine the charging capability of optional power adapter 112 (i.e., if it is capable of providing the charging voltage) based on a determined voltage or resistance.

We now describe another embodiment of the charger circuit. In this embodiment, a multi-loop system with selector control is used. In particular, the multi-loop system monitors multiple feedback variables, but only the most pertinent variable or loop is selected to regulate the multi-loop system output at any given time. The loop selection criteria are chosen to enhance system reliability and to improve system response time.

The multi-loop system may be used in conjunction with a voltage regulator and battery charger for portable electronic devices such as smartphones, tablets, and laptops. For example, lithium-ion (Li-ion) batteries are widely used in these portable electronic devices because of their high energy density, long cycle life, and absence of memory effects. However, Li-ion batteries are very sensitive to and can be easily damaged by overcharged voltages. Consequently, the charging processing may be split into two main phases, a constant-current (CC) mode and constant-voltage (CV) mode, to prevent the battery from being overcharged. While Li-ion batteries are mentioned here as an illustration, note that the embodiments of the charger circuit may be used with a wide variety of rechargeable batteries and, more generally, one or more electrochemical cells that convert stored chemical energy into electrical energy.

During CC mode, the battery-current feedback loop is dominant and the battery is charged with a constant current source. When the multi-loop system voltage reaches the target voltage, the charger switches to CV mode, where the system-voltage feedback loop becomes dominant, and the battery is charged with a decaying current from a constant voltage source. In addition to the two main charging modes, the battery charger typically also protects the input adapter from over-current conditions. Thus, a third current-limit (CL) mode is introduced to monitor the input adapter current. (However, as described further below, there may be additional charging modes.)

Figure 4:
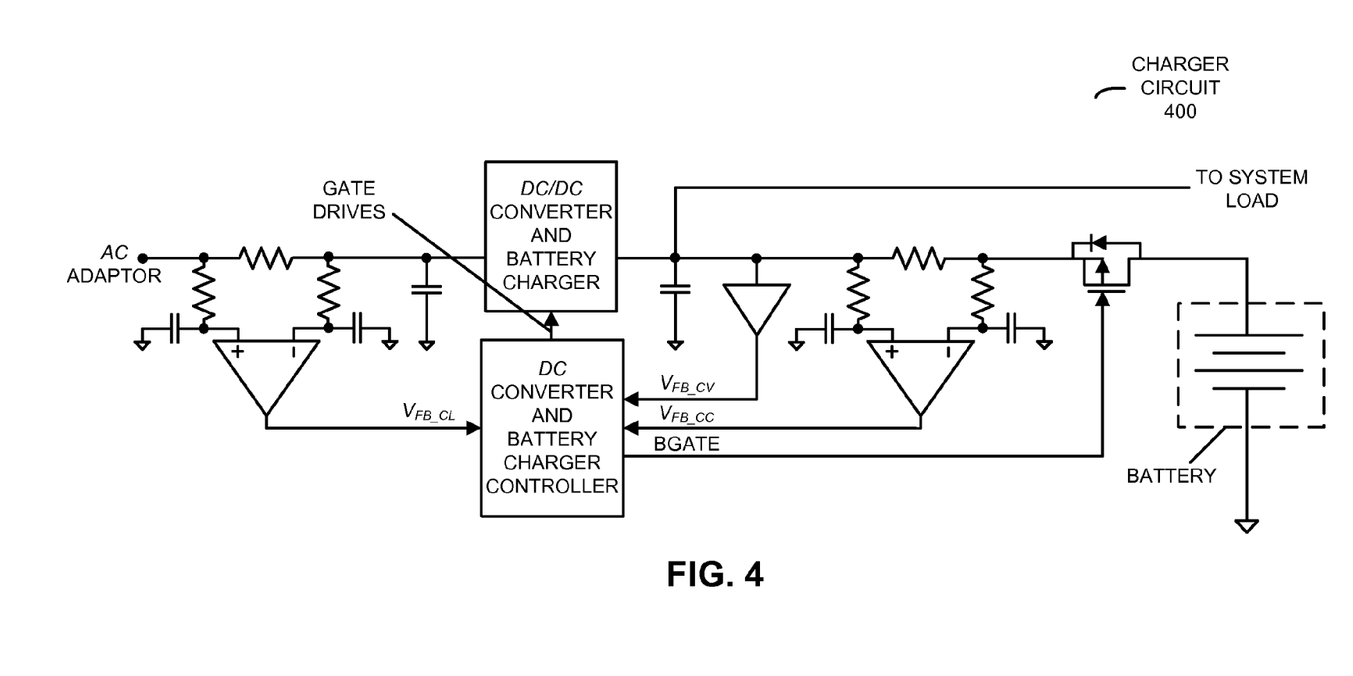
FIG. 4 is a block diagram illustrating a charger circuit in accordance with an embodiment of the present disclosure.

A block diagram of a charger circuit 400 that includes the multi-loop system is illustrated in FIG. 4. This charger circuit includes: a DC/DC converter and battery charger and a DC converter and battery charger controller. Note that the DC/DC converter and battery charger shown in FIG. 4 can be a buck, boost, buck-boost, or any other switching-converter architecture. Moreover, in the multi-loop system implemented in the DC/DC converter and battery charger controller, the small-signal transfer functions and loop dynamics may vary significantly among the loops.

Figure 5:
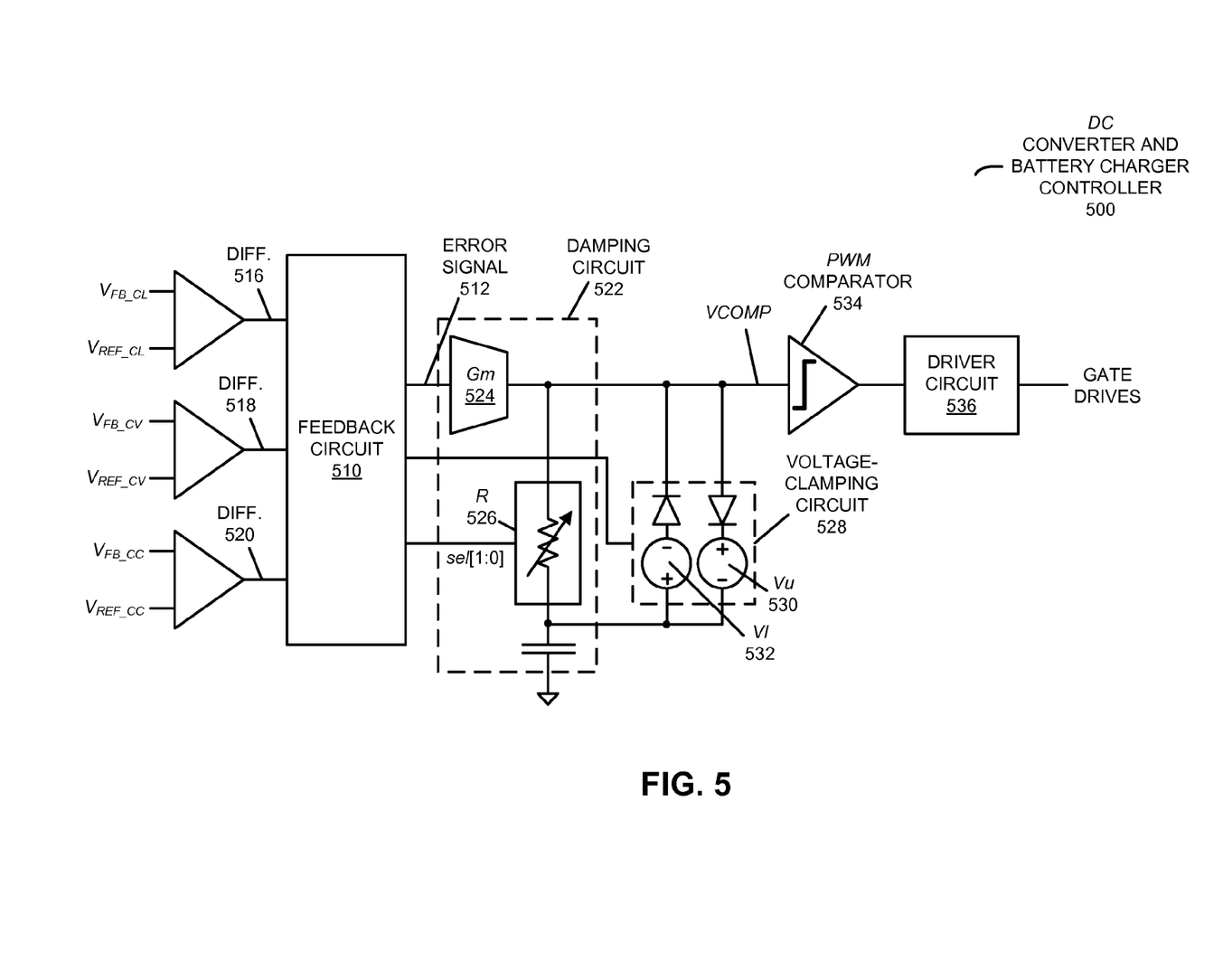
FIG. 5 is a block diagram illustrating a DC converter and battery charger controller in the charger circuit of FIG. 4 in accordance with an embodiment of the present disclosure.

Consequently, different compensation networks are often optimized and employed for each loop in order to achieve the best small-signal performance for each loop, such as loop bandwidth and phase margin. Furthermore, the drive towards miniaturization and component minimization has further encouraged the use of a single, reconfigurable, compensation network in selector-controlled multi-loop systems. In this configuration, the compensation network is designed to change based on the active loop selected to regulate the output in order to optimize the small-signal performance of the individual loops. This capability is illustrated in FIG. 5, which presents a block diagram illustrating a DC converter and battery charger controller 500 in charger circuit 400 (FIG. 4). This DC converter and battery charger controller includes: feedback circuit 510 which selects an error signal 512 from a plurality of feedback sources (which may include a difference 516, a difference 518 and a difference 520), a damping circuit 522, a voltage-clamping circuit 528, a pulse-width-modulation (PWM) comparator 534 and a driver circuit 536.

Note that, while reconfigurability of compensation network is good for small-signal performance and stability, the sudden changes in amplifier 524 gain (Gm) and compensation resistance or impedance (R) 526 can create large-signal voltage steps on the control voltage (VCOMP). These large, instantaneous voltage steps in VCOMP cause overshooting or undershooting responses, which, in turn, result in large-signal oscillation in the selected mode of operation (which is sometimes referred to as 'mode chattering'). Mode chattering behaviors are undesirable and can be observed during mode-transitioning events in the adapter current waveforms in the context of a voltage regulator and battery charger.

A variety of approaches may be used to mitigate mode chatter, such as sacrificing small-signal loop bandwidth by either limiting amplifier 524 output or reducing compensation resistance or impedance 526 while increasing the compensation capacitance. In order to reduce the mode-chattering problem without impacting the small-signal AC behavior of the loops, a large-signal stabilizing network is proposed to dynamically limit the voltage amplitude across the compensation resistor during large-signal mode-transitioning events.

As shown in FIG. 5, feedback circuit 510 selects error signal 512 for use in charging a battery, where, at a given time, error signal 512 corresponds to a feedback source, and where the feedback source is one of a plurality of feedback sources with a plurality of feedback sources, including: difference (diff.) 516 between an input current ($V_{FB\_CL}$) and an input current reference ($V_{REF\_CL}$) different (diff.) 518 between an output voltage ($V_{FB\_CV}$) and an output voltage reference ($V_{REF\_CV}$), and difference (diff.) 520 between a battery charging current ($V_{FB\_CC}$) and a battery charging current reference ($V_{REF\_CC}$). However, the plurality of feedback sources shown in FIG. 5 (and in FIGS. 6 and 7) are intend as illustrations. In some embodiments, the plurality of feedback sources includes one or more additional feedback sources, such as: temperature, input power and/or an input voltage.

Moreover, damping circuit 522 includes amplifier 524 (that has a gain Gm) and an impedance or resistance R 526 to ground to error signal 512, and where feedback circuit 510 selects the gain of amplifier 524 and impedance 526 to ground of damping circuit 522 based on the selected error signal 512. For example, impedance 526 to ground may be selected using a compensation network. Note that the gain and impedance 526 may be modified by dynamically adjusting the gain and impedance 526 (i.e., gain and impedance 526 may be programmable). Alternatively, values from a set of fixed values may be selected.

Furthermore, voltage-clamping circuit 528 has one or more clamping voltages, such as an upper clamping voltage (Vu) 530 and/or a lower clamping voltage (Vl) 532. Feedback circuit 510 selects upper clamping voltage 530 and/or lower clamping voltage 532 based on the selected error signal 512. In FIG. 5, the diodes in voltage-clamping circuit 528 are optional.

Note that the selected gain of amplifier 524, impedance 526 to ground, upper clamping voltage 530 and/or lower clamping voltage 532 reduce transients associated with a transition from a first feedback source in the plurality of feedback sources to a second feedback source in the plurality of feedback sources. For example, the selected gain of amplifier 524 and impedance 526 to ground of damping circuit 522 may modify a transient response of damping circuit 522 to be overdamped and/or critically damped. In addition, upper clamping voltage 530 and/or lower clamping voltage 532 may clamp the impulse response of DC converter and battery charger controller 500.

In some embodiments, DC converter and battery charger controller 500 includes a driver circuit 536 that outputs gate drives. In addition, DC converter and battery charger controller 500 may include PWM comparator 534 (however, other types of modulation may be used), which functions as a buffer.

The large-signal voltage clamp in FIG. 5 effectively limits the over- and undershooting responses and thereby significantly reduces the possibility of mode chattering. Furthermore, because the voltage-clamping functions are large-signal only, the small-signal dynamics of the individual loops may remain unchanged. Thus, by partitioning the compensation design and mode-chatter mitigation considerations, one can better optimize the overall small-signal dynamics of the control loops.

Figure 6:
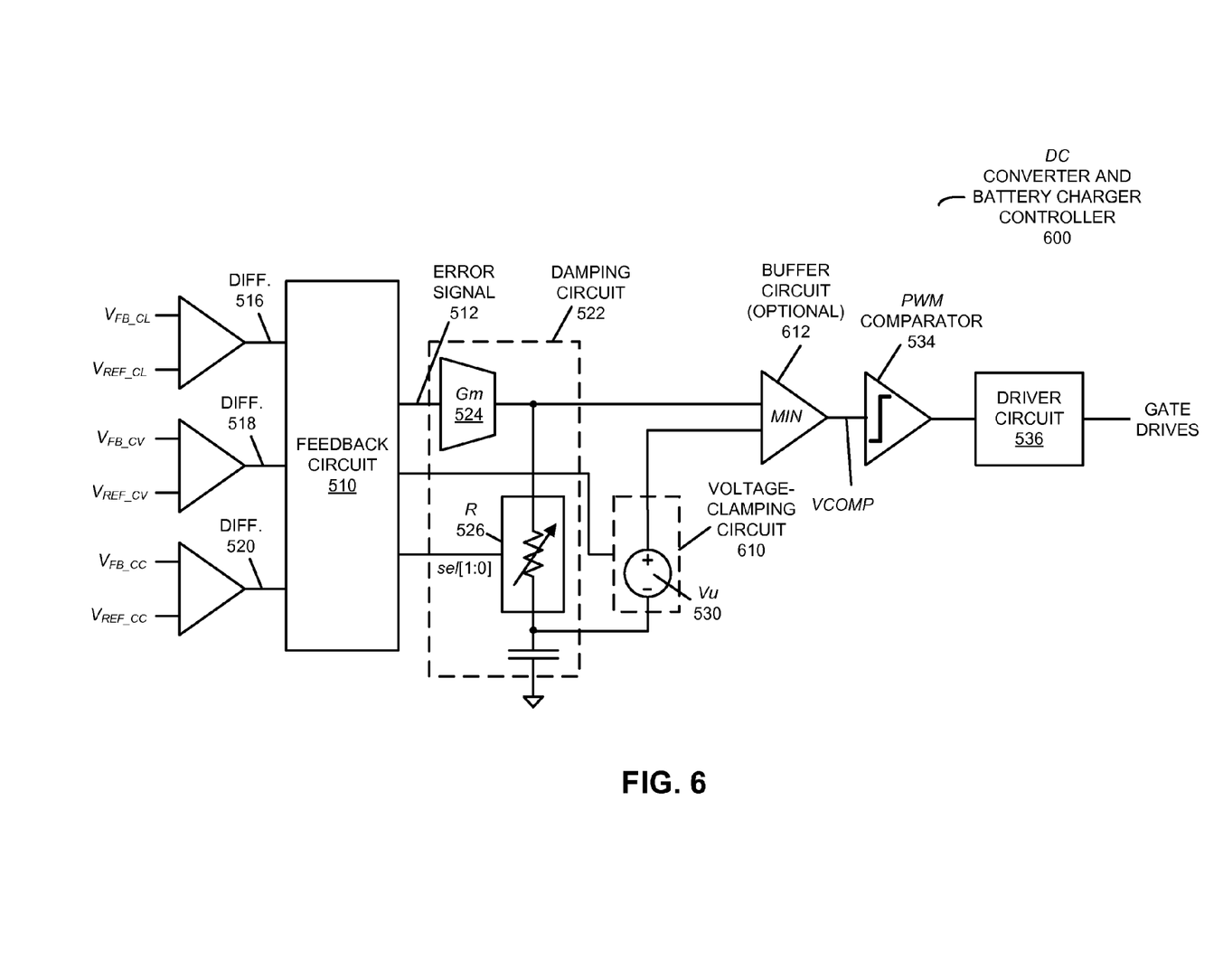
FIG. 6 is a block diagram illustrating a DC converter and battery charger controller in the charger circuit of FIG. 4 in accordance with an embodiment of the present disclosure.
Figure 7:
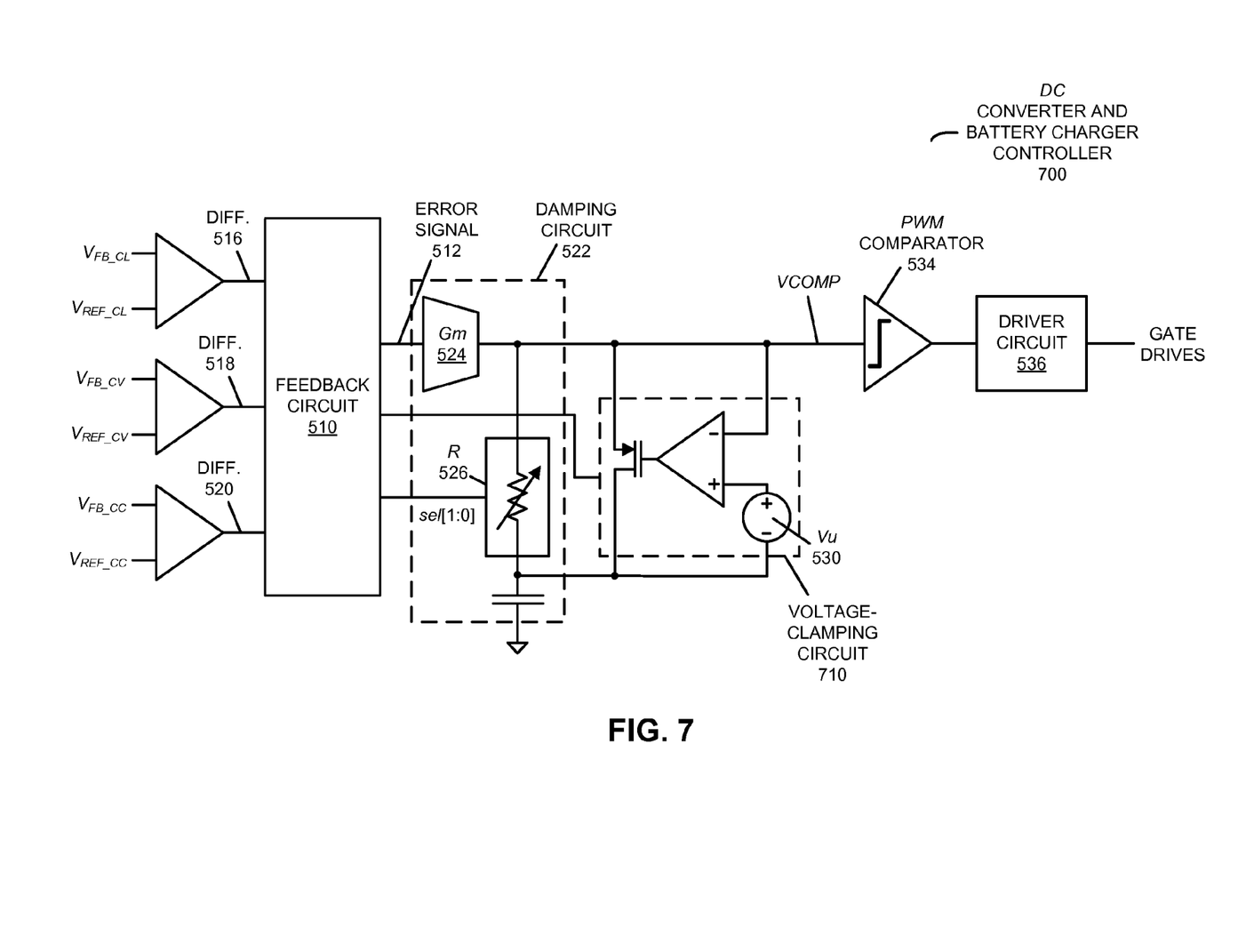
FIG. 7 is a block diagram illustrating a DC converter and battery charger controller in the charger circuit of FIG. 4 in accordance with an embodiment of the present disclosure.

Alternate embodiments of the large-signal stabilizing networking that are added to the compensator are shown in FIGS. 6 and 7, which, respectively, present block diagrams of a DC converter and battery charger controller 600 and a DC converter and battery charger controller 700 in charger circuit 400 (FIG. 4). In FIG. 6, voltage-clamping circuit 610 may provide a single-sided voltage clamp in conjunction with optional buffer circuit 612. Similarly, in FIG. 7, voltage-clamping circuit 710 may provide a single-sided voltage clamp. In each case, these embodiments limit mode chatter and modify a transient response to reduce or eliminate oscillations, thereby speeding convergence.

Note that the high- and low-side clamping voltages (i.e., upper clamping voltage 530 and/or lower clamping voltage 532) may be fixed or programmable. In addition, depending on the loop-selection criteria, the programmable gain values, and the programmable resistor values, a single-sided clamp can also be used (as shown in FIGS. 6 and 7). In some embodiments, a capacitor to ground (not shown) is included in parallel with voltage-clamping circuit 528 (FIG. 5), voltage-clamping circuit 610 (FIG. 6), or voltage-clamping circuit 710 in FIG. 7.

While in the illustrated embodiments the multi-loop selector-controlled system is represented by a battery-charger circuit, it should be appreciated by those skilled in the art that the conception and specific embodiment disclosed may be readily utilized as a basis for modifying or designing other multi-loop system compensator networks for carrying out the same purposes or function as the disclosed embodiments.

Figure 8:
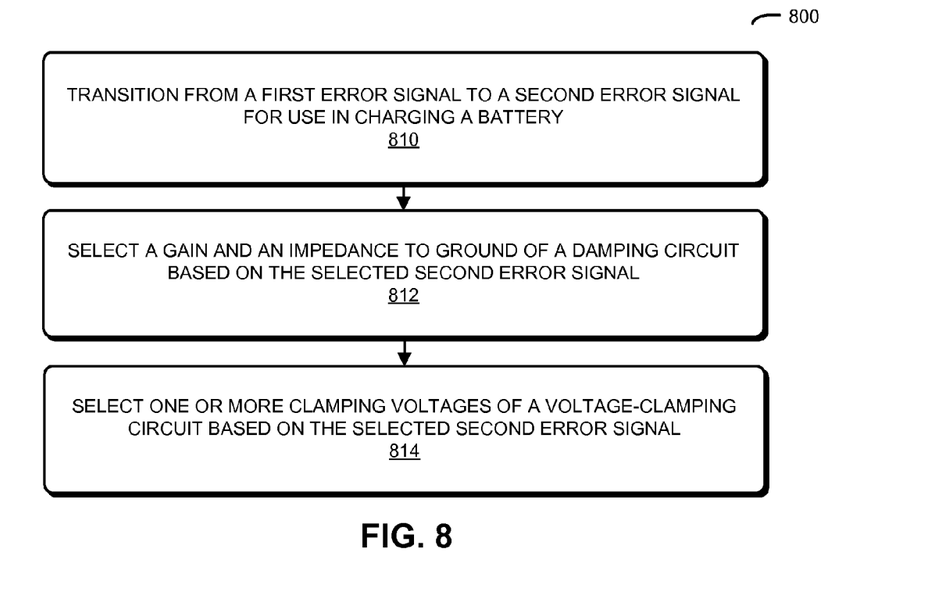
FIG. 8 is a flowchart illustrating a method for reducing transients associated with a transition from a first error signal to a second error signal in accordance with an embodiment of the present disclosure.

We now describe embodiments of another method. FIG. 8 presents a flowchart illustrating a method 800 for reducing transients associated with a transition from a first error signal to a second error signal, which can be performed using one of DC converter and battery charger controller 500 (FIG. 5), DC converter and battery charger controller 600 (FIG. 6) or DC converter and battery charger controller 700 (FIG. 7). During this method, a transition is made from the first error signal to the second error signal for use in charging a battery (operation 810), where the first error signal and the second error signal, respectively, correspond to feedback sources in a plurality of feedback sources. Then, a gain and an impedance to ground of a damping circuit are selected based on the selected second error signal (operation 812), where the damping circuit applies the gain and the impedance to ground to the second error signal. Next, one or more clamping voltages of a voltage-clamping circuit are selected based on the selected second error signal (operation 814), where the voltage-clamping circuit applies the one or more clamping voltages to an output from the damping circuit.

In some embodiments of method 800, there may be additional or fewer operations. Moreover, the order of the operations may be changed, and/or two or more operations may be combined into a single operation.

Figure 9:
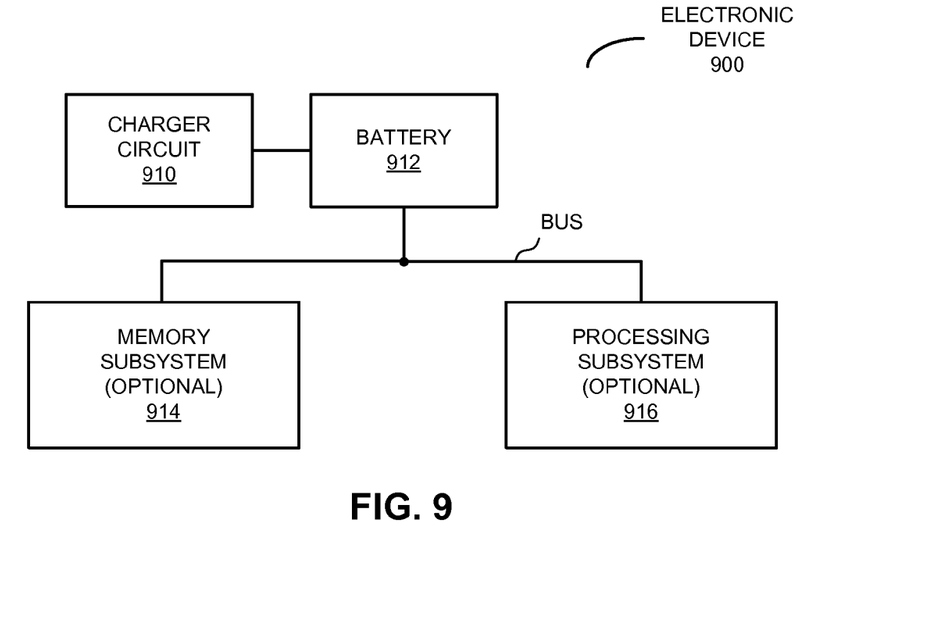
FIG. 9 is a block diagram illustrating an electronic device that includes a charger circuit in accordance with an embodiment of the present disclosure.

An embodiment of the charger circuit may be used in an electronic device. This is shown in FIG. 9, which presents a block diagram illustrating an electronic device 900 that includes a charger circuit 910, such as charger circuit 108 (FIG. 1), DC converter and battery charger controller 500 (FIG. 5), DC converter and battery charger controller 600 (FIG. 6) and/or DC converter and battery charger controller 700 (FIG. 7), and a battery 912.

In general, functions of the embodiments of the charger circuit may be implemented in hardware and/or in software. Thus, electronic device 900 may include one or more program modules or sets of instructions stored in an optional memory subsystem 914 (such as DRAM or another type of volatile or non-volatile computer-readable memory), which may be executed by an optional processing subsystem 916 (which includes one or more integrated circuits). (In general, the charging technique may be implemented more in hardware and less in software, or less in hardware and more in software, as is known in the art.) Note that the one or more computer programs may constitute a computer-program mechanism. Furthermore, instructions in the various modules in optional memory subsystem 914 may be implemented in: a high-level procedural language, an object-oriented programming language, and/or in an assembly or machine language. Note that the programming language may be compiled or interpreted, e.g., configurable or configured, to be executed by the processing subsystem.

Components in power system 100 (FIG. 1), charger circuit 108 (FIG. 1), interface connector 110 (FIGS. 1 and 2), charger circuit 400 (FIG. 4), DC converter and battery charger controller 500 (FIG. 5), DC converter and battery charger controller 600 (FIG. 6), DC converter and battery charger controller 700 (FIG. 7) and electronic device 900 may be coupled by signal lines, links or buses. While electrical communication has been used as an illustrative example, in general these connections may include electrical, optical, or electro-optical communication of signals and/or data. Furthermore, in the preceding embodiments, some components are shown directly connected to one another, while others are shown connected via intermediate components. In each instance the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Moreover, the circuits and components may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

Electronic device 900 may include one of a variety of devices that can include a power source (such as a battery) and/or a power supply, including: a desktop computer, a server, a laptop computer, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Although we use specific components to describe power system 100 (FIG. 1), charger circuit 108 (FIG. 1), interface connector 110 (FIGS. 1 and 2), charger circuit 400 (FIG. 4), DC converter and battery charger controller 500 (FIG. 5), DC converter and battery charger controller 600 (FIG. 6), DC converter and battery charger controller 700 (FIG. 7) and electronic device 900, in alternative embodiments different components and/or subsystems may be used. Additionally, one or more of the components may not be present in FIGS. 1, 2, 4-7 and 9. In some embodiments, power system 100 (FIG. 1), charger circuit 108 (FIG. 1), interface connector 110 (FIGS. 1 and 2), charger circuit 400 (FIG. 4), DC converter and battery charger controller 500 (FIG. 5), DC converter and battery charger controller 600 (FIG. 6), DC converter and battery charger controller 700 (FIG. 7) and electronic device 900 include one or more additional components that are not shown in FIGS. 1, 2, 4-7 and 9. For example, the charger circuit may be implemented in an integrated circuit. Moreover, while FIG. 1 illustrates a single-stage charger circuit, in other embodiments the charger circuit includes multiple stages. In addition, while FIG. 1 illustrates a non-inverting, full-switch buck-boost converter circuit, in other embodiments one or more of a wide variety of different charger circuits are used. Also, although separate components are shown in the preceding embodiments, in some embodiments some or all of a given component can be integrated into one or more of the other components and/or positions of components can be changed. Note that control logic 118 (FIG. 1) may be pre-programmed with the charging voltage of optional battery 122 (FIG. 1), so that the signal line that conveys output signal 126 may not need to be coupled to control logic 118 (as shown in FIG. 1). Similarly, the input voltage may be provided by interface connector 110 (FIG. 1) to control logic 118 (FIG. 1), so that the signal line that conveys input signal 114 (FIG. 1) may not need to be coupled to control logic 118 (as shown in FIG. 1).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A charger circuit, comprising:
   a feedback circuit configured to select an error signal for use in charging a battery, wherein, at a given time, the error signal corresponds to a feedback source, and wherein the feedback source is one of a plurality of feedback sources;
   a damping circuit coupled to the feedback circuit, wherein the damping circuit is configured to apply a gain and an impedance to ground to the error signal, and wherein the feedback circuit is configured to select the gain and the impedance to ground of the damping circuit based on the selected error signal; and
   a voltage-clamping circuit coupled to the damping circuit, wherein the voltage-clamping circuit has one or more clamping voltages, and
   wherein the feedback circuit is configured to select the one or more clamping voltages based on the selected error signal.

2. The charger circuit of claim 1, wherein the plurality of feedback sources includes: a difference between an input current and an input-current reference, a difference between an output voltage and an output-voltage reference, and a difference between a battery-charge current and a battery-charge-current reference.

3. The charger circuit of claim 2, wherein the plurality of feedback sources further includes one or more of: a temperature, an input power and an input voltage.

4. The charger circuit of claim 1, wherein the one or more clamping voltages include an upper clamping voltage.

5. The charger circuit of claim 1, wherein the one or more clamping voltages include a lower clamping voltage.

6. The charger circuit of claim 1, wherein the selected gain, the impedance to ground, and the one or more clamping voltages reduce transients associated with a transition from a first feedback source in the plurality of feedback sources to a second feedback source in the plurality of feedback sources.

7. The charger circuit of claim 1, further comprising a comparator and a driver circuit coupled to the voltage-clamping circuit and configured to couple to a DC/DC converter.

8. The charger circuit of claim 7, wherein the comparator includes a pulse-width-modulation comparator.

9. The charger circuit of claim 7, further comprising a buffer circuit coupled to the comparator and the driver circuit.

10. The charger circuit of claim 1, wherein the selected gain and the impedance to ground of the damping circuit modify a transient response of the damping circuit to be one of: overdamped and critically damped.

11. An electronic device, comprising:
    an integrated circuit;
    a battery coupled to the integrated circuit; and
    a charger circuit, coupled to the battery, wherein the charger circuit includes:
    a feedback circuit configured to select an error signal for use in charging the battery, wherein, at a given time, the error signal corresponds to a feedback source, and wherein the feedback source is one of a plurality of feedback sources;
    a damping circuit coupled to the feedback circuit, wherein the damping circuit is configured to apply a gain and an impedance to ground to the error signal, and wherein the feedback circuit is configured to select the gain and the impedance to ground of the damping circuit based on the selected error signal; and
    a voltage-clamping circuit coupled to the damping circuit, wherein the voltage-clamping circuit has one or more clamping voltages, and
    wherein the feedback circuit is configured to select the one or more clamping voltages based on the selected error signal.

12. The electronic device of claim 11, wherein the plurality of feedback sources includes: a difference between an input current and an input-current reference, a difference between an output voltage and an output-voltage reference, and a difference between a battery-charge current and a battery-charge-current reference.

13. The electronic device of claim 12, wherein the plurality of feedback sources further includes one or more of: a temperature, an input power and an input voltage.

14. The electronic device of claim 11, wherein the one or more clamping voltages include an upper clamping voltage.

15. The electronic device of claim 11, wherein the one or more clamping voltages include a lower clamping voltage.

16. The electronic device of claim 11, wherein the selected gain, the impedance to ground, and the one or more clamping voltages reduce transients associated with a transition from a first feedback source in the plurality of feedback sources to a second feedback source in the plurality of feedback sources.

17. The electronic device of claim 11, further comprising a comparator and a driver circuit coupled to the voltage-clamping circuit and configured to couple to a DC/DC converter.

18. The electronic device of claim 17, wherein the comparator includes a pulse-width-modulation comparator.

19. The electronic device of claim 11, wherein the selected gain and the impedance to ground of the damping circuit modify a transient response of the damping circuit to be one of: overdamped and critically damped.

20. A method for reducing transients associated with a transition from a first error signal to a second error signal, wherein the method comprises:
    transitioning from the first error signal to the second error signal for use in charging a battery, wherein the first error signal and the second error signal, respectively, correspond to feedback sources in a plurality of feedback sources;
    selecting a gain and an impedance to ground of a damping circuit based on the selected second error signal, wherein the damping circuit applies the gain and the impedance to ground to the second error signal; and selecting one or more clamping voltages of a voltage-clamping circuit based on the selected second error signal, wherein the voltage-clamping circuit applies the one or more clamping voltages to an output from the damping circuit.

\* \* \* \* \*